United States Patent [19]

Michaud

[11] Patent Number: 4,512,288
[45] Date of Patent: Apr. 23, 1985

[54] FURNACE HEAT EXCHANGER

[76] Inventor: Roger Michaud, 530 Patricia Blvd., Timmins, Ontario P4N 6Z2, Canada

[21] Appl. No.: 514,054

[22] Filed: Jul. 15, 1983

[51] Int. Cl.³ .............................................. F22B 33/00
[52] U.S. Cl. ................................ 122/20 B; 122/421; 126/365; 237/19
[58] Field of Search ................ 122/20 B, 421; 237/19; 126/364, 365

[56] References Cited

U.S. PATENT DOCUMENTS

| | | |
|---|---|---|
| 2,521,462 | 9/1950 | Kinzelmann . |
| 3,124,087 | 3/1964 | Ross ................................ 237/19 X |
| 3,896,992 | 7/1975 | Borovina et al. ............. 122/20 B X |
| 4,037,567 | 7/1977 | Torres . |
| 4,037,786 | 7/1977 | Munroe . |
| 4,066,210 | 1/1978 | Pemberton et al. . |
| 4,136,731 | 1/1979 | DeBoer .......................... 122/20 B X |
| 4,143,816 | 3/1979 | Skadeland . |
| 4,210,102 | 7/1980 | Dosmann . |
| 4,232,657 | 11/1980 | Killorin . |
| 4,251,028 | 2/1981 | Nicolai et al. . |
| 4,258,878 | 3/1981 | Van Pachtenbeke ........ 122/20 B X |
| 4,292,933 | 10/1981 | Meier et al. . |
| 4,318,367 | 3/1982 | Antonucci . |
| 4,417,546 | 11/1983 | Hoskinson ........................ 122/20 B |

FOREIGN PATENT DOCUMENTS

| | | |
|---|---|---|
| 682638 | 3/1964 | Canada . |
| 0013018 | 12/1979 | European Pat. Off. . |
| 2922833 | 4/1979 | Fed. Rep. of Germany . |
| 2924049 | 6/1979 | Fed. Rep. of Germany . |
| 2933911 | 8/1979 | Fed. Rep. of Germany . |
| 2936297 | 9/1979 | Fed. Rep. of Germany . |
| 2947496 | 11/1979 | Fed. Rep. of Germany . |
| 2025022 | 6/1978 | United Kingdom . |
| 2040414 | 11/1978 | United Kingdom . |
| 2061476 | 5/1981 | United Kingdom . |

*Primary Examiner*—Edward G. Favors
*Attorney, Agent, or Firm*—Hirons, Rogers & Scott

[57] ABSTRACT

A heat recovery system recovers heat from flue gases from a furnace or the like and a hot water cylinder. Flue gases are passed through series of chambers in which coils are located. Water is passed through the coils in a direction opposite to flue gas flow to maximize heat transfer and the heated water is passed to either a heat radiating system or into preheater tank for the hot water supply. The coils for the heat radiation and water heating are in separate circuits and the flue gases from the hot water is passed only over the coil used for water heating. Pumps are used for water recirculation in both the heat radiating circuit and the water heating circuit. The system has application to domestic and industrial furnaces which provide gaseous combustion products with recoverable thermal energy and permits the use of a small diameter exhaust vent without adversely affecting the ignition and combustion system of conventional furnaces.

16 Claims, 1 Drawing Figure

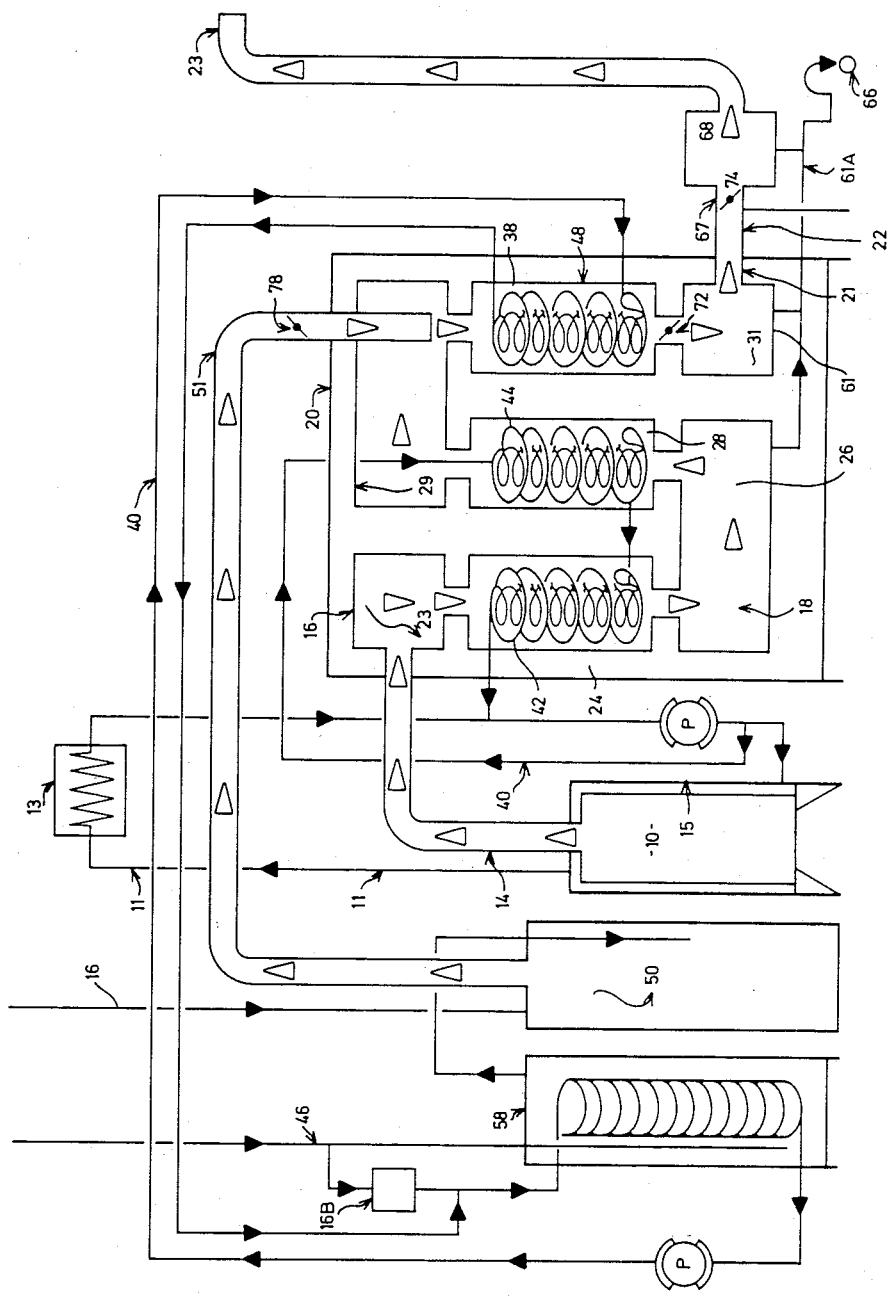

FURNACE HEAT EXCHANGER

The present invention relates to a heat recovery system, particularly but not exclusively for use with domestic furnaces fuelled with gas, oil or propane.

With conventional gas, oil or propane furnaces, combustion of the energy supply usually results in the production of flue gases which retain relatively large amounts of heat but which are, because of their toxic nature, exhausted directly to atmosphere through chimneys or "B" vents. This results in a considerable wastage of energy and reduction in the efficiency of the system.

A heat recovery system is disclosed in U.S. Pat. No. 4,210,102 in which flue gases contact a heat exchanger with a set of water heating coils. The flue gases pass around the coils and the water within the coils is used to heat water within a hot water heater. The heat transfer by this arrangement is relatively inefficient because the furnace operates independently of the water temperature so that if hot water is not being drawn from the heater much of the usable thermal energy in the flue gases is not recovered. Moreover, because the heat recovery unit may be bypassed, the outlet to atmosphere must be sized to take hot flue gases so that when reduced temperature gases are exhausted there is considerable condensation in the chimney. This is highly undesirable and in order to reduce this effect the amount of heat extracted from the flue gas must be limited.

An object of the present invention is to obviate or mitigate the above said disadvantages.

According to the present invention there is provided a heat recovery system comprising input means for receiving the flue gases from a furnace, convoluted passage means for directing the flow of said flue gases to an outlet, heat exchange means located in proximity to said convoluted passage means, said heat exchange means containing a heat exchange medium adapted to receive heat energy from said flue gases as they flow through said heat exchange conduit.

Preferably, the heat exchange medium is water.

An embodiment of the present invention is presented, by way of example with reference to the accompanying drawing which is a schematic diagram showing the general layout of a heat recovery system including the flow paths of the flue gases and the heat exchange medium.

Referring now to the drawing a heating system comprises a furnace 10 which is an atmospheric gas fired hot water furnace whose combustion products are exhausted into a 6 inch flue 14. The furnace 10 supplies heat to a conventional recirculating water system 11 including a bank of radiators 13 and a pump 15 to maintain water circulation. The flue 14 is connected to an inlet duct 16 of a heat exchange unit 18 which is located in an insulated cabinet 20. The unit 18 has an outlet 21 which is connected to a 6 inch exhaust conduit 22 through which flue gases are passed to the atmosphere via a 2 inch ABS vent 23. Connected between the inlet duct 16 and outlet is an inlet chamber 23 connected to a first generally vertical heat exchanger chamber 24. The lower end of chamber 24 is connected by a transverse chamber 26 to a second vertical heat exchange chamber 28 which in turn is connected by a transverse chamber 29 to a third vertical heat exchange chamber 30. The third vertical chamber 30 is connected to the outlet 20 through an exit chamber 31. Each of the vertical chambers 24, 28 and 30 are hollow cylindrical tubes of 8 inches internal diameter in which heat exchange coils are mounted The flue 51 of a conventional gas fired water heater 50 is fed through an outlet pipe 52 into the transverse chamber 29 between the vertical chambers 26, 28 so that the exhaust gases of the water heater 50 only pass through the chamber 30. The water cylinder 50 receives water from the main supply 46 through a preheater tank 58 and heats and stores the water to supply it on demand to the domestic outlets.

Heat is recovered from the flue gases in two separate circuits, a first heat exchange circuit 40 which includes two coil assemblies 42 and 44 located within the chambers 24, 28 respectively and a second heat exchange circuit 46 in which a coil assembly 48 is located in the chamber 30. Each of the coil assemblies 42, 44, 48 comprises a pair of helically wound denoted by suffixes a and b respectively, which are connected in parallel and mounted one within the other.

In the first heat exchange circuit 40 the coil assemblies 42, 44 are connected in series and the circuit 40 is arranged in parallel with the system 11 such that water from the circuit 11 is pumped by a pump 15 through the coil assemblies 42, 44 and returned to the low pressure side of the pump 15. The direction of flow of the water in the coils is from top to bottom of the coil assembly 44 and vice versa for coil assembly 42 so that the water in the coils flows counter the direction of flow of the flue furnace gases indicated by arrows 70. Thus in the vertical chambers 26, 28 heat from the flue gases is transferred to the water in the coil assemblies so that water entering the jacket of the furnace for circulation to the radiators 13 is preheated. The counter flow circulation maximises the heat transfer to improve the efficiency of the system.

The second heat exchange circuit 46 serves to preheat the water supplied to the tank 58 from the main supply 46. A coil 60 is located in the tank 58 and is connected by conduits 62 to opposite ends of the coil 48. A pump 52 is provided in one of the conduits 62 to provide water circulation. Flue gases passing through the chamber 30 transfer heat to the water within the coil assembly 48 and transfers heat from the flue gases to water in the tank 58. As water is taken from the heater 50, water heated by the circuit 46 is drawn from the heater tank 58 into the heater 50 and thus there is less energy required to heat the water in the heater 50 to the required temperature. A make up valve 46b is provided between the main supply 46 and the conduit 62 to ensure the conduits remain full at all times and to accommodate expansion of the water as it is heated.

The transverse chamber 26, the outlet chamber 31 the exhaust conduit 22 each have drain valves 61 so that any condensed water vapour can be extracted. The valves are connected by one and one-half inch diameter pipe 62 to an open drain 66 such as is normally found in the basement of a house.

To ensure exhaust of the combustion products a two speed fan 67 is located in a chamber 68 of the exhaust conduit 22 to augment extraction of the flue gases and to make the recirculation process more efficient. The fan is operated at low speed, typically 20 c.f.m. while the furnace is at idle and upon ignition of the furnace is operated at high spped, typically 60 c.f.m., to accommodate the increased volume of combustion products. The flow of combustion products is also regulated by a balancing damper 72 located between the chamber 30 and outlet chamber 31 and by damper 74 located in the flue 22 and a danger 78 located in the heater flue 51. With this arrangement of dangers it has been found possible to provide a discharge pressure of 0.5 inches of water gauge in the vent pipe 23 whilst maintaining a pressure of −0.005 inches of water gauge at the combustion chamber of the furnace 10. Thus, it is possible to utilise atmospheric fired furnace.

Various modifications may be made to the embodiment described without departing from the scope of the invention. For example the number of coils used and the sizes and types of materials used could be varied and if desired mixing valves could be used on the heat exchangers to control the termperature at which the water is recirculated.

The opposite flow of coolant and exhaust gas ensures maximum heat recovery and hence efficiency of the heat exchange system and the collection of condensation and water vapour avoids condensation in chimneys and damage such as mortar erosion. Moreover since the exhaust products flow through the heat exchangers, the flue 23 may be dimensioned to provide the correct discharge coefficient for the flue for correct operation.

It will be noted that the provision of a separate heat exchange chamber for each of the circuits ensures that a heat sink is available whenever one of the appliances is activated. Thus if the water heater is activated the heat of the exhaust gas is used to supplement the heat being supplied by the heater and similarly upon heat being required in the radiator circuit II the furnace flue gases are used to supplement this function. In tests conducted on a prototype installation the flue gases had an initial temperature of 390° F. A temperature drop of 150° F. was observed across the chamber 28 and a further temperature drop of 100° F. observed across the chamber 28 representing a considerable energy recovery. This was achieved with chamber 24,28,30 of nominal diameter eight inches and the coil assemblies 42,44,48 having coils of nominal 7 inch and 5 inch diameter would from ½ inch diameter copper pipe.

Embodiments of the invention in which an exclusive property or privilege is claimed are defined as follows:

1. A heat recovery system for recovering heat from the flue gases of a plurality of heating appliances each supplying heat to a respective heat transfer medium, said system comprising first and second interconnected duct means to receive the flue gases of respective ones of said appliances and convey the gases to a common outlet, a first heat recovery circuit operatively connected to said heat transfer medium of said first appliance and including a first heat exchange means located in said first duct and a second heat recovery circuit operatively connected to said heat transfer medium of said second appliance and including a second heat exchange means in said second duct said ducts being arranged such that one of said heat exchange means is supplied with flue gases from only one of said appliances.

2. A heat recovery system according to claim 1 wherein said first and second ducts are arranged in series so that flue gases from said first appliance pass over said second heat exchange medium.

3. A heat recovery system as according to claim 2 wherein said first duct includes a pair of discrete chambers connected in series and each having a heat exchanger located therein.

4. A heat recovery system as according to claim 3 wherein said heat exchangers in said chambers are connected in series.

5. A heat recovery system as according to claim 4 wherein each of said heat exchangers includes a pair of coolant conveying coils connected in parallel.

6. A heat recovery system according to claim 4 wherein coolant in said first circuit flows counter to the flow direction of said flue gases.

7. A heat recovery system as claimed in claim 6 wherein the heat exchange medium in said distribution system is water.

8. A heating installation comprising a first appliance to supply heat to a heat transfer medium for space heating, a second appliance to supply heat to elevate the temperature of water in a distribution system, and a heat recovery unit for recovering heat from the combustion products of said first and second applicance, said heat recovery unit including first duct means for receiving combustion products from said first applicance, first heat exchange means located in said first duct and connected in a first heat circulation system to transfer heat from said first heat exchange means to said space heating heat transfer medium, second duct means for receiving combustion products from said second applicance and second heat exchange means located in said second duct and connected in a second heat circulation system to transfer heat from said second heat exchange means to water in said distribution sytem.

9. A heating installation according to claim 8 wherein said space heating transfer means is water circulated in a closed loop by a pump and said first heat circulation system is connected in parallel to said closed loop and an opposite sides of said pump.

10. A heating installation according to claim 8 wherein said second heat circulation system includes a heat exchanger located in a holding tank to preheat water prior to supply to said second appliance.

11. A heating installation according to claim 8 wherein said first and second ducts are connected in series.

12. A heating installation according to claim 11 including a vent pipe downstream of said second duct and a two speed fan is connected to remove gas from said vent pipe.

13. A heating installation according to claim 12 wherein said first duct includes a pair of interconnected chambers, each of which has a heat exchange assembly located therein.

14. A heating installation according to claim 13 wherein said chambers are connected in series.

15. A heating installation according to claim 14 wherein said second duct includes a third chamber connected in series with said first and second chambers.

16. A heating installation according to claim 15 wherein flue gas from said second appliance is introduced between said second and third chambers.

* * * * *